United States Patent
Lindenthal

(10) Patent No.: US 6,170,627 B1
(45) Date of Patent: Jan. 9, 2001

(54) SAFETY CLUTCH

(75) Inventor: Hans Lindenthal, Heidenheim (DE)

(73) Assignee: Voith Turbo GmbH & Co., KG, Heidenheim (DE)

(*) Notice: Under 35 U.S.C. 154(b), the term of this patent shall be extended for 0 days.

(21) Appl. No.: 09/284,093

(22) PCT Filed: Oct. 8, 1996

(86) PCT No.: PCT/EP96/04362

§ 371 Date: Jul. 6, 1999

§ 102(e) Date: Jul. 6, 1999

(87) PCT Pub. No.: WO98/15751

PCT Pub. Date: Apr. 16, 1998

(51) Int. Cl.[7] .................................................. F16D 43/286
(52) U.S. Cl. ........................ 192/56.3; 192/88 B; 192/150
(58) Field of Search ............................. 192/56.3, 88 B, 192/150; 403/5; 464/30, 32

(56) References Cited

U.S. PATENT DOCUMENTS

| | | | |
|---|---|---|---|
| 3,686,919 | * | 8/1972 | Brusa .................................. 74/384 X |
| 4,264,229 | * | 4/1981 | Falk et al. ................................ 403/5 |
| 4,635,769 | * | 1/1987 | Eastcott ............................ 192/150 X |
| 4,662,492 | * | 5/1987 | Troeder ............................ 192/150 X |
| 4,752,275 | * | 6/1988 | Lindenthal et al. ................. 403/5 X |
| 4,982,617 | * | 1/1991 | Munker et al. ................ 192/88 B X |
| 5,051,018 | * | 9/1991 | Appell et al. ............................ 403/5 |

FOREIGN PATENT DOCUMENTS

| | | |
|---|---|---|
| 29 23 902 A1 | 6/1979 | (DE). |
| 40 28 158 | * 3/1991 | (DE). |
| 41 12 484 | * 10/1992 | (DE). |

* cited by examiner

*Primary Examiner*—Rodney H. Bonck
(74) *Attorney, Agent, or Firm*—Taylor & Aust, P.C.

(57) ABSTRACT

A safety clutch transmits torque between two coaxial machine parts. The safety clutch includes a basic body for the at least indirect frictionally engaged connection of two machine parts, and at least one thin-walled sleeve which forms a wall of an annular chamber upon which pressure medium can act. At least one feed line extends through the basic clutch body to the annular chamber and can be closed in an air and fluid-tight manner by closure elements, in particular closure valves. A pressure-relief mechanism can act at least indirectly on the closure elements. The pressure-relief mechanism is coupled to an arrangement for detecting a disturbance variable. The clutch includes devices which activate the pressure-relief mechanism when the influencing quantity occurs.

20 Claims, 2 Drawing Sheets

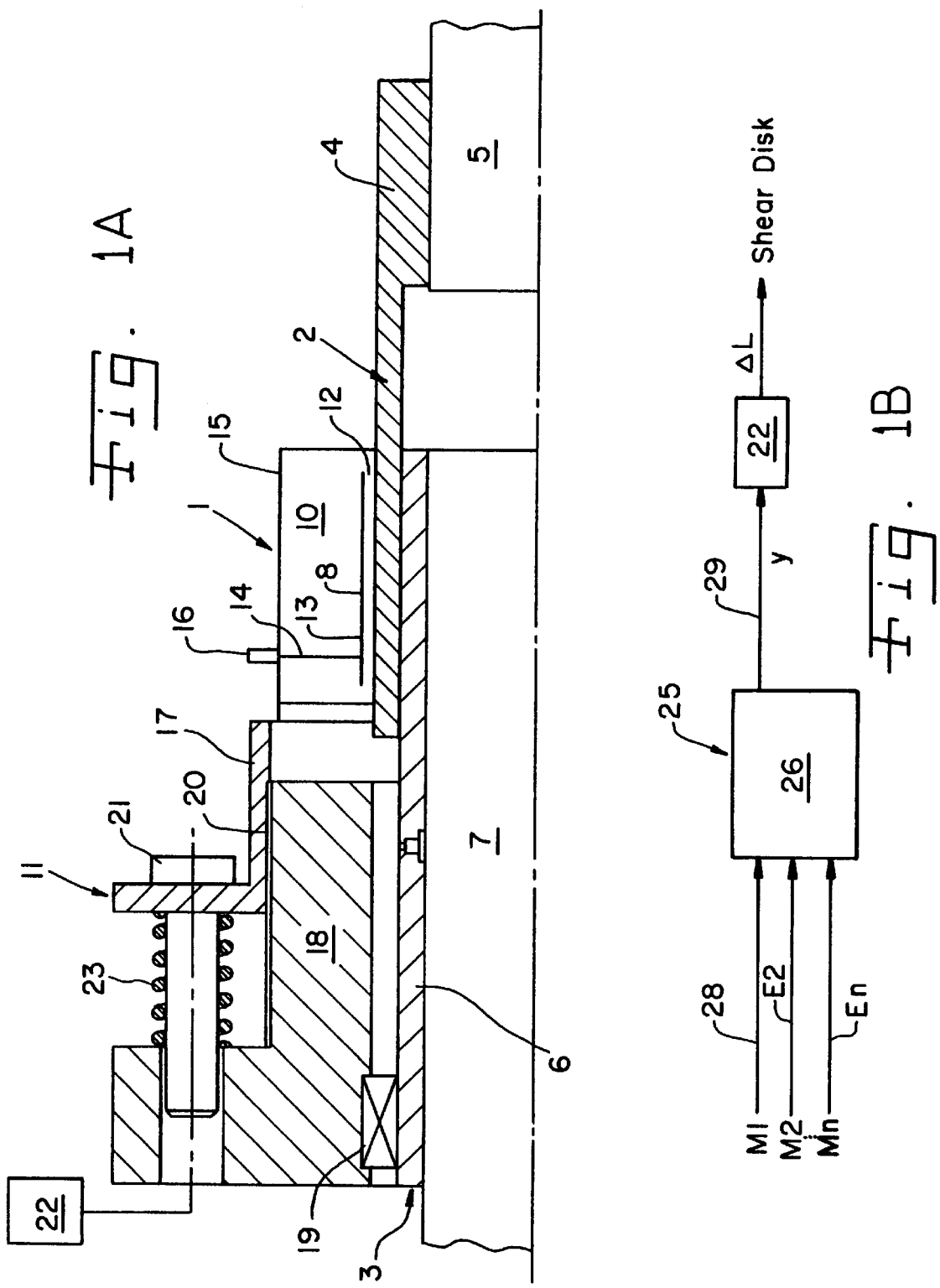

SAFETY CLUTCH

BACKGROUND OF THE INVENTION

1. Field of the Invention

The present invention relates to a safety coupling designed to transfer torque between two machine components sharing the same axis.

2. Description of the Related Art

An exemplification of such a safety coupling is published in the German paper DE-OS-29-23-902. The safety coupling serves to transfer torque between two machine components sharing the same axis, while preventing unacceptably high torque increases. The safety coupling includes at least one thin-walled sleeve, forming a wall of a ring-shaped chamber extending in axial direction. The ring-shaped chamber can be pressurized with a medium in order to elastically deform the sleeve in radial direction, causing it to jam against the surface of an element onto which the coupling is mounted. Adjacent to the ring-shaped chamber are drillings, which are a part of a safety device or coupling relief device. As a result of the relative motion between the surfaces and the actions of the relief mechanism, the pressurized medium residing in the ring-shaped chamber can escape through the drillings, thus lowering the pressure inside the chamber.

To transfer a certain torque level, a certain surface pressure is required. For that purpose, oil is being pumped into the chamber, which is needed to deform the respective machine components relative to one another. In this way, the coupling is adjusted to the desired torque capacity. If, during an overload condition, this torque is exceeded, the coupling slips. The maximum torque level that can be transmitted is lowered because the effective, static friction coefficient transitions into the sliding friction coefficient. There is a relative motion in circumferential direction between the individual elements of the two machine components, which are jammed relative to one another. A shear disk mounted on one machine component shears off a shear valve, opening the connection to the ring-shaped chamber of the coupling. After shearing off the shearing valve (or valves), the pressurized oil can freely expand and the torque to be transmitted reduces to zero within a few milliseconds.

The disadvantage of these types of safety couplings centers around the fact that these couplings respond only when there is a relative motion between the surfaces which are jammed against one another (one of which is formed by the coupling body), or upon or a certain drivetrain-related torsional motion. This can cause permanent, irreparable damage in the drivetrain, which is reflected in an increase in the cost associated with the re-setting of the coupling to its original state as it operated prior to its activation. Furthermore, the relative motion or torsional deformations are directly linked to each other. Thus, the placement of the coupling is restricted to those areas, in which high torque levels should be avoided, thereby limiting the scope of the application of this coupling from the very beginning.

SUMMARY OF THE INVENTION

The present invention provides a safety coupling, of the type mentioned in the introduction, which avoids the disadvantages. An overload safety device for preventing a torque overload condition is cost-effective, easy to manufacture, as well as fast responding. The overload safety device designed to prevent a torque overload condition is effective at torque levels which are only minimally above the maximum allowable torque. The magnitude of the maximum allowable torque to be transmitted is adjusted so that, if this torque is exceeded, the torque transmission can be quickly disrupted. Furthermore, the overload safety device designed to prevent a torque overload condition offers a rapid response time, i.e., a short period of time between the occurrence of an unacceptable high torque level and the interruption of the torque transmission, and is not limited to only the deformation in the drivetrain.

The safety coupling, designed to transfer torque between two machine components sharing the same axis—a first machine component and a second machine component—is placed in a drivetrain and is equipped with a coupling body to frictionally engage the two machine components. The coupling body includes at least one thin-walled sleeve forming a wall of a ring-shaped chamber extending in axial direction. The ring-shaped chamber can be pressurized with a medium. There is at least one supply drilling, extending through the coupling body to the ring-shaped chamber. Sealing valves seal the supply drillings in an air/fluid tight manner. There is also a relief mechanism provided. This relief mechanism includes at least one machine part containing an explosive substance which, in the event of an overload condition, is triggered to explode, allowing the supply drillings to open. The explosive substances are either solid, liquid, or viscid substances or substance mixtures which, after ignition by sparks, flames, or impact, etc., rapidly release large amounts of compressible gases, causing destructive effects in its immediate surroundings.

For the triggering and relief of the coupling and the storage of the explosive substance, there are at least two possibilities. The triggering can occur directly, i.e., the explosive substance is integrated directly in the sealing valves and ignited there. The triggering by the machine element carrying the explosive substance can occur indirectly, i.e., the relief mechanism includes a shear device. The explosive substance is applied to "connectors" and is activated at the site of the shear device.

In the latter mentioned case, conventional shear devices are used, including devices such as the shear disk, for example. The shear disk is placed in a fixed position relative to the coupling body and, when triggered, the disk can be moved in axial or radial direction relative to the coupling body. Additional devices to accelerate this relative motion are feasible. The machine part containing the explosive substance can be designed in the form of separator bolts or explosive bolts, for example. The explosive bolts are placed parallel to the centerline of the driveshaft and are mounted so they can slide in axial direction with respect to the sealing valves. A minimum of three equally-spaced explosive bolts are arranged on the drive shaft. The shear device itself can be mounted in a torsionally rigid manner onto the driveshaft, although it is moveable in axial direction. One possibility of such an arrangement includes the use of a splined shaft connection between the driveshaft and the shear device. The shear device can also be mounted in a freely rotating manner on the drive or driven shaft. A torsionally rigid connection is not necessarily required, although it appears to be a good solution when applied in combination with a shear disk, since the disk with the respective oblong openings can be designed to accommodate the sealing valves, which are frequently designed in the form of valves.

The machine parts containing the explosive substances are coupled with an ignition device which is activated in response to a signal from the coupling. The coupling is in the form of a control unit, including at least one input for actual values and one output. The input or inputs are each connected to a torque sensing/acquisition device which is part of the power take-off drivetrains. The actual value for the current torque is compared with either a fixed or a calibratable maximum allowable torque value stored in the control device. If a deviation occurs, a signal is issued at the output of the control device, initiating the triggering of the relief mechanism, or in this case, the ignition of the explosive bolt. Since the data transfer, the data comparison and the triggering of the relief mechanism occurs at the speed of light, such a safety coupling is especially useful for rapid triggering during a torque overload condition or during any other disturbances. The relief mechanism can be triggered immediately upon recognition of a torque spike or even prior to that event. Mechanical sensing/acquisition devices always have some delays in this regard.

A further possibility is to locate the shear device by use of pre-loaded springs or separator bolts (which also need to be ignited), and upon triggering (i.e., the result of an overload condition), an acceleration of the shear device toward the sealing valves takes place. The shear device can be designed so that it interacts with the sealing valves in radial as well as axial direction. The addition of the pre-tension accelerates the relief action.

In a design where the machine part containing the explosive substance is a sealing valve, this element includes a base body and a retainer serving as a limit-stop for the base body. The base body includes a seal unit which blocks the supply drilling in the assembled state, and a cap containing the explosive substance. The retainer includes at least one drilling which extends—in the assembled state—from the area constrained by the base body and the retainer, through the retainer and all the way to its periphery. The retainer is positively engaged to the base body of the coupling. The retainer usually is threaded and screws into the base body of the coupling. The base body is equipped with at least one initiating electrode and a distributor ring for generating a spark. The initiating electrode is connected to the base body and rotates at the same speed during normal operation. The distributor ring is mounted solidly against the machine frame.

The relief mechanism or the element containing the explosive substance is coupled to a device capable of sensing the torque in the drivetrains, and/or the value proportional to the torque. There is a device for each drivetrain. The coupling includes devices designed to activate the relief mechanism upon exceeding the torque and/or the value proportional to the torque. The activation of the relief mechanism occurs through the triggering of the explosive substance.

The safety coupling is a remote operated coupling which is triggered in response to an occurrence of a disturbance value i.e., a value representing the current torque and/or a characteristic value which is proportional to the torque.

In terms of the triggering method, there are several possibilities that should be considered. The torque of each power take-off can be sensed, especially of each universal drivetrain. A value proportional to the torque on the individual power take-offs can also be sensed (for example: the roll forces, speed differences observed in a roll mill). Parameters of the materials to be processed which are indirectly proportional to the torque value can also be sensed (in roll mills—temperature and thickness of materials). Finally, a value can be captured which is beginning to indirectly (not directly)—albeit time-phase shifted—affect the torque transfer or the work in progress. For example, the capture of vibration in the foundation or in its surrounding (in case of an earthquake), or the development of smoke. For these cases, the application of the device, as disclosed by this invention, becomes more interesting.

The determined values can be compared to a not-to-be-exceeded command value in order to generate a signal to control the relief mechanism by use of a control device. A mechanical device is also feasible.

The disturbance value that is to be determined or captured can be simply the deviation, in particular the torque excursion, or the deviation of the value proportional to the torque, with respect to a commanded value. The actual number value of the deviation, as well as the fact that the permissible values were exceeded, are used as signals to trigger the relief mechanism. There is the possibility that the recognition of just one value, such as the presence of smoke, for example, can lead to the triggering of the relief mechanism. What exactly constitutes a disturbance value and how to capture/recognize it depends on the individual applications and their boundary conditions.

In accordance to this invention, the remote triggering of a safety coupling—when integrated into a drivetrain—offers the capability of a premature triggering event without the likelihood of damage to the drivetrain, which means, in effect, the system responds as an early warning system. Furthermore, it is possible to trigger the safety coupling at different torque transfer values so that in drive systems including multiple power take-off drivetrains, one safety coupling is sufficient to interrupt the torque transfer in the drive system, based on an observed torque spike on a single power take-off drivetrain. This significantly lowers the cost of such as system.

The design of the safety coupling, in accordance to this invention, and the applicable relief mechanism (which is part of the coupling), facilitates a fast-responding overload protection device. It is also a cost-effective torque overload protection safety device when applied to a drive system in which the power generated by a power source is transferred onto several consumers by use of power take-off drivetrains, because not every power take-off requires a separate overload protection device.

For sensing the torque, or for determining a value proportional to the torque on the universal drivetrain or on the rolls, or for determining the disturbance value, different systems of sensing or capturing these values can be used. The torque sensing and/or the determination of the value proportional to the torque and/or the disturbance value can be accomplished mechanically, electronically, or optically. The optimum method for the individual application is to be determined by the local circumstances. Mechanical sensing/acquisition devices are based on the strain gage principle or on a mechanical torque measurement device. It is also feasible to use combinations of the various methods for sensing torque.

The coupling of the device used to measure the torque and/or the value proportional to the torque and/or the disturbance value to the relief mechanism is best accomplished electronically. Mechanical coupling is feasible; however, it requires precise manufacturing tolerances since the distance between the sensing location and the sheering device is usually very large. The connection between the sensing/acquisition device and the relief mechanism can be accomplished, for example, by an electronic control device whose inputs include "torque exceeded" and whose outputs include a signal to slow down the sheer device or to ignite the explosive substance.

The explosive bolts are coupled with an ignition device which is activated in response to a signal from the operational monitoring system. The operational monitoring system is in the form of a control unit including at least two inputs for actual values and one output. The two inputs are each connected to a torque-sensing device which is part of the power take-off drivetrains. The actual value for the current torque is compared with either a fixed or a calibratable maximum allowable torque value stored in the control device. If a deviation occurs, a signal is issued at the output of the control device, initiating the triggering of the relief mechanism, or in this case, the ignition of the explosive bolt. Since the data transfer, the data comparison and the triggering of the relief mechanism occurs at the speed of light, such a safety coupling is especially useful for rapid triggering during a torque overload condition or during any other disturbances. The relief mechanism can be triggered immediately upon recognition of a torque spike, or even prior to that event. Mechanical sensing/acquisition devices always have some delays in this regard.

A further possibility is to locate the shear device by use of pre-loaded springs or separator bolts (which also need to be ignited), and upon a triggering event, (i.e., the result of an overload condition) an acceleration of the shear device toward the sealing valves takes place. The shear device can be designed so that it interacts with the sealing valves in radial as well as axial direction. The addition of the pre-tension accelerates the relief action.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1a is a partial, side, sectional view of one embodiment of a safety coupling with shear disk integrated to the safety coupling, which is activated through explosive devices, causing a differential motion between the shear disk and the sealing valves;

FIG. 1b is a wiring diagram of a control system for a relief mechanism;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2A:
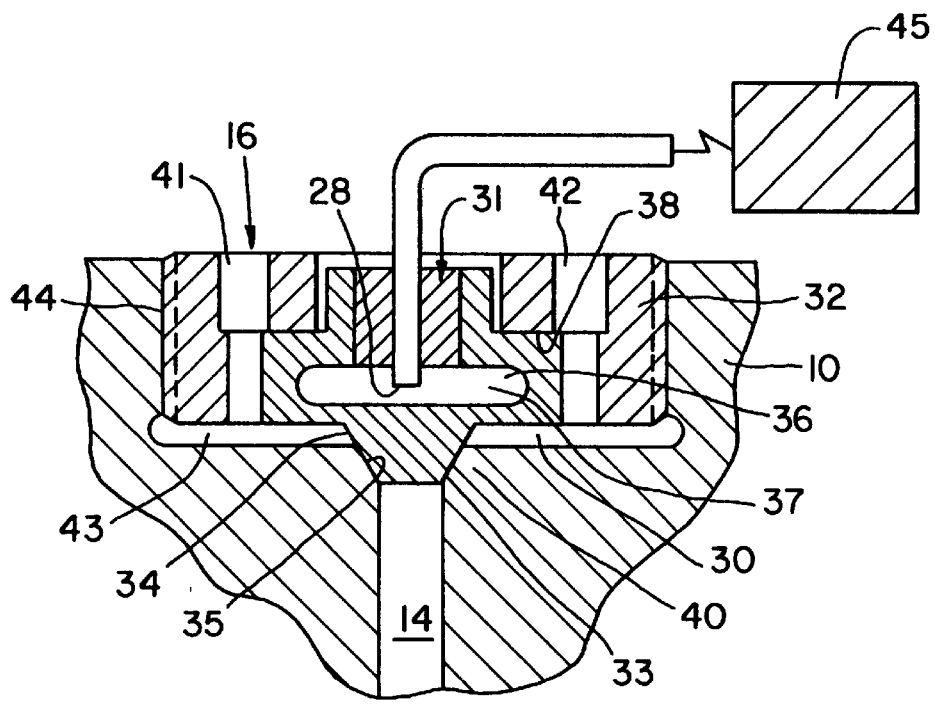
FIG. 2a is a fragmentary sectional view of an embodiment of a safety coupling, according to this invention, with the explosive substance integrated into the sealing valves before a triggering event.

Referring now to the drawings and particularly to FIG. 1a, there is shown a cross-sectional view of a drivetrain including a safety coupling, designed in accordance with this invention. The torque is transmitted from a power source (not shown here) via drivetrains onto at least one power take-off. The drivetrain is equipped with a safety coupling 1, providing a non-positive connection between a first machine component 2—which is directly connected to the power source and, hence, can be viewed as belonging to the "drive side"—and a second machine component 3, to which the torque is transmitted. The first machine component 2 is designed in form of a bushing 4, which is connected torsionally rigid to driveshaft 5. Driveshaft 5 can be directly connected to the power source. The second machine component 3 is part of the power take-off and is also designed in the form of a bushing 6, which is connected to power take-off shaft 7 in a torsionally rigid manner. By designing machine parts in an appropriate fashion, the realization of a non-positive connection between the first machine component 2 and the second machine component 3 by use of a safety coupling 1 can also be accomplished in radial direction. To this end, a sleeve-like extension of the first and second machine components 2 and 3 in axial direction is required.

The coupling body 10 includes at least one thin-walled sleeve 12 forming a wall 8 of the pressurized, ring-shaped chamber 13. Ring-shaped chamber 13 can be pressurized with a medium in order to elastically deform the sleeve 12 in radial direction. Integrated to the ring-shaped chamber 13 are supply drillings 14 (a minimum of one), which substantially extend from the outer periphery 15 of the coupling body 10 radially inward to the ring-shaped chamber 13. Supply drillings 14 are sealed in an air/fluid tight manner by shear valves 16. Shear valves 16 protrude only minimally beyond the outer periphery 15 of coupling body 10. Coupling body 10 encompasses bushing 4 in radial direction. Shear disk 17 of the relief mechanism 11 is supported by bushing 6, which in turn is supported by bushing 18 and bearing 19.

Shear disk 17 is connected to bushing 18 in a torsionally rigid manner by a splined shaft connection 20. Shear disk 17 is moveable with respect to bushing 18 in axial direction along a path which is parallel to the centerline of driveshaft 7. During normal operation, shear disk 17 is held in position with respect to the sealing valves 16 by separator bolts 21. In addition to the torsional connection provided by the splined shaft 20, the shear disk 17 is also held in place axially with respect to bushing 18 by separator bolt 21. Bushing 18 can either be solidly connected to the machine frame which means bushing 18 and, hence, shear disk 17 are stationary during normal operation, or, the shear disk 17 rotates at the same rotational speed as the safety coupling, or it rotates at a different rotational speed. In the first and last mentioned case, the shear disk 17 is not equipped with any openings to encompass the sealing valves 16, while in the case where the rotational speeds between the coupling body 10 and the shear disk 17 are the same, openings on the outer periphery of the shear device are definitely feasible.

Separator bolts 21 are filled with either solid, liquid, or viscid substances or substance mixtures which, after ignition by sparks, flames, or impact, etc., rapidly release large amounts of compressible gases, causing destructive effects in its immediate surrounding to the extent that the connection is released by the separator bolts 21. In an overload condition, the separator bolts 21 are fired, either by spark or by telemetry. This causes the shear disk 17 to be accelerated in the axial direction and subsequently shears off the caps of the sealing valves 16, which are mounted on the coupling body 10.

To this purpose, the separator bolts 21 are coupled to a device 22 designed to activate the explosive substance, which, once again, is connected to the output of a control device, as shown in FIG. 1b, from which the signal to trigger the ignition process, in accordance to the established torque signals, originates. The explosion causes an axial separation between bushing 18 and shear disk 17. Due to the force associated with the explosion and the splined shaft connection 20 facilitating the relative axial motion between bushing 18 and shear disk 17, the shear disk 17 is moved axially towards the sealing valves 16. To accelerate the axial motion and, hence, to shorten the time period between the triggering event (the explosion event) and the "shearing off" action, shear disks 17 are pre-loaded by springs 23. Bushing 18 serves as a support base for the springs 23. At the point of separation of the screw connection 21, the spring force of spring 23 directionally acting towards sealing valves 16 provides an additional momentum to shear disk 17, corresponding to the pre-load of spring 23.

The activation of the relief mechanism 11 is accomplished through coupling 25 with at least one sensing device M for sensing the torque on the power take-off drivetrains, and/or the value proportional to the torque. Sensing device M may also be referred to as a capturing device or as a detecting device. The last mentioned proportional values can be characteristic values for the material that is being processed. In case of roll mills, for example, it is feasible to capture the temperature or a basic dimension of the material being processed as a characteristic value. If these values are exceeded (relative to a pre-determined threshold), during normal operation, a blockage and therefore an unusual increase in the required torque levels can be the consequence. Principally, any value that has any effect on the torque on the power take-off can be used as a comparative value, and the influence can be accomplished either directly or indirectly. It is also feasible to process disturbance values, which can impact the manufacturing process, retroactively. Example—the breakout of a fire or an earthquake.

Coupling 25 can be a control device, as shown in FIG. 1b by the wiring diagram. It includes a control unit 26, which has at least one input 28 and one output 29. Input 28 is connected to a sensing device M1 to determine the torque in the power-take-off drivetrain. The torque sensing/acquisition devices can be of various types. To acquire the torque, mechanically-based torque sensing/acquisition devices can be utilized. These can be designed as published in the brochures by the corporation, "Ringspan". These work on the basic principle that a small torsional deformation is converted into an axial movement by use of a lever system. This axial motion is then converted into a voltage signal proportional to the torque by an inductive difference generator. These torque-proportional voltage signals can subsequently function as input signals to a control/regulator unit, which processes these signals into an output signal for the activation of the shear device. If several power take-off drivetrains are present, then every power take-off drivetrain should be equipped with a sensing device (M2 . . . Mn), which are connected to the input (E2 . . . En) to the control unit 26. Control unit 26 compares the actual values with predetermined allowable limit values stored in the control unit 26. Upon recognition of a difference between these values, a signal y is issued to device 22 (device designated to activate explosive substance) through output 29 of control unit 26. This, according to the embodiment shown in FIG. 1b, has the consequence of a differential axial movement by shear disk 17, by the amount of delta L.

Control device 25 can also process other input values, which are values that are simply proportional to the expected torque on the power take-off drivetrain. These values can also be obtained, for example, with sensors.

As far as the design and activation of the shear device is concerned, there is a plurality of possible variations. This device is not necessarily tied to application of a shear disk. Also, the shearing action can occur in radial direction. The important feature is the generation of a relative motion between the shear device and coupling body, which facilitates the interaction between the sealing valves and the shear device. However, they all have one thing in common: upon recognition of a torque spike, a firing of the explosive substance occurs, generating an immediate force acting on the valve, which, in turn, causes the sealing valves to vent, triggering an interruption of the torque transmission by hydraulically jamming sleeves and bushings. More design variations are accorded to the expert's discretion, which is why these additional design variations are not further elaborated here.

In addition to the aforementioned separator bolt, containing the explosive substance, there are other parts, such as studs or valves, which can be used for this purpose. The number of the machine parts that contain the explosive substance, as well as the number of sealing valves on the periphery of the coupling body, depends on the requirements and the desired response of the triggering event. Increasing the number of supply drillings and, therefore, the number of sealing valves can influence it. The separator bolts and the elements holding the explosive substances are published in various forms in brochures by "Dynamit Nobel" (a corporation).

Figure 2B:
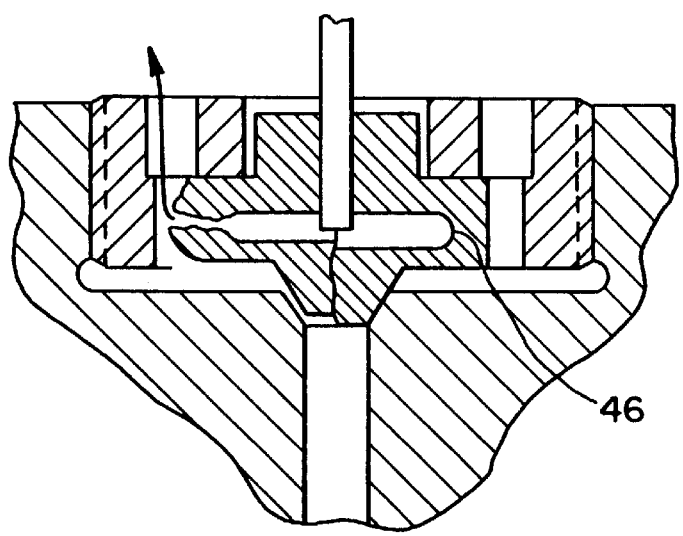
FIG. 2b is a fragmentary sectional view of the safety coupling of FIG. 2a after a triggering event.

FIGS. 2a and 2b illustrate a design approach of the machine parts making up the blasting composition, for the purpose of triggering the safety coupling—before and after the trigger event. The machine part containing the blasting composition in this exemplification is the sealing valve. The speed at which this device triggers the safety coupling is related, among other things, to the number of elements containing the blasting composition, i.e., the number of sealing valves. The principle construction of the safety coupling is in accordance to the drawing shown in FIG. 1, therefore, the labeling used on this figure is the same as used on FIG. 1.

FIG. 2a depicts a cross-sectional view of the coupling body 10 of the safety coupling, in particular, a part of the supply drilling 14 and the sealing valve 16. Supply drilling 14 is shown wider in the area of the outer circumference 15 of the coupling body 10. A transitional range 40 of a continuously widening opening (in the outward direction) is preceding the widened area at the periphery. The widened area, here labeled with 30, serves to encapsulate the sealing valve 16. Sealing valve 16 includes a base body 31 and a retainer 32. Base body 31 includes a sealing unit 33, which is designed as a seal cone in FIG. 2a. The conical part of the seal cone 33 mates against the matching transitional surface 35 inside the transitional range 40. Adjacent to the seal cone 33 resides the explosive substance 36. Immediately adjacent to the seal cone 33—in radial direction—resides a gas generator 37, which is linked to igniter 28. Gas generator 37 is embedded into base body 31. Base body 31 is located radially by retainer 32, which also serves as a limit-stop. Retainer 32 is designed as a bushing, whose inner surface includes an opening, which form the limit-stop surface 38 for base body 31. Furthermore, the retainer includes a through-bore 41 and 42, which connects the open area 43—the area remaining during normal operation and formed by retainer 32 and base body 31 in the widened area of the supply drilling—to the atmosphere.

Retainer 32 is threaded on its periphery 44, which serves to make up a screw connection to the widened end area of supply drilling 14 in coupling body 10.

The ignitor or the initiating electrode 28 is connected solidly to base body 31 in the case being described, which means it rotates together with the coupling body 10. To support the ignition process, a distributor ring is provided, which can be mounted solidly on the machine frame or on the housing of another machine component and—due to the large difference in voltage between distributor ring and initiating electrode—a spark is generated. For this purpose, distributor ring 45 is connected directly to the output of control unit 26, as depicted in FIG. 1*b*. The signal from the control unit 26 causes voltage to be present at the distributor ring 45. Another method of transferring energy includes the use of telemetry.

FIG. 2*b* shows an embodiment, in accordance to FIG. 2*a*—after the ignition event. It can be seen that the effects of the explosion destroyed the wall areas 46 of the base body in the area of generator 37, and, as a result of the low counter pressure, seal unit 33 is radially displaced from its seat, causing the transition area 40 to open. The pressurized medium escapes from the pressure chamber, via the supply drilling 14 to the transition area 40 into area 43 and across the bores in the retainer 41, 42, to the outside. The pressure chamber is in a relaxed state, and the non-positive connection between the surfaces of the machine parts, which are jammed against one another, is suspended.

The design shown in FIGS. 2*a* and 2*b* is one alternative in terms of the integration of the machine parts containing the explosive substance into the sealing valves. Other design alternatives are feasible.

Also essential for a rapid triggering of the safety coupling is the number of the sealing valves (there is no requirement that every sealing valve must contain an explosive substance), as well as the cross-sectional area that is generated for the escaping gas as a result of the explosion. However, the response time decreases as the number of "triggered" sealing valves increases.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A safety coupling configured for transferring torque between two coaxial machine components in a drivetrain, said safety coupling comprising:
    a coupling body configured for non-positively connecting the two machine components, said coupling body including:
        at least one thin-walled sleeve having a wall partially defining a pressurizable ring-shaped chamber; and
        at least one supply drilling extending through said coupling body and in fluid communication with said ring-shaped chamber;
    a plurality of sealing valves configured for fluid-tight sealing of said at least one supply drilling;
    a relief mechanism configured for acting directly on said sealing valves;
    a detecting device configured for detecting a disturbance and assigning a disturbance value to the detected disturbance, said detecting device being connected to said relief mechanism; and
    an activating device configured for activating said relief mechanism upon appearance of the disturbance value.

2. The safety coupling of claim 1, said safety coupling further comprising a control device including a control unit having:
    at least one input configured for being coupled to said detecting device; and
    at least one output configured for outputting a signal for said relief mechanism.

3. The safety coupling of claim 2, wherein said control unit comprises a comparison device configured for comparing an actual value of a disturbance to a predefined command value.

4. The safety coupling of claim 1, further comprising a converter coupled to said detecting device, said converter being configured for converting signals from said capturing device into a signal to trigger said relief mechanism.

5. The safety coupling of claim 1, wherein the disturbance value is a deviation of a commanded value from at least one of a torque of individual power take-off drivetrains and a value that is proportional to the torque.

6. The safety coupling of claim 5, wherein the value that is proportional to the torque is an operating parameter of a material to be processed by a machine which is to be driven.

7. The safety coupling of claim 6, wherein the machine which is to be driven includes at least two rolls of a roll mill and wherein the operating parameter is at least one of a thickness and a temperature of the material being processed by the at least two rolls.

8. The safety coupling of claim 5, wherein the value that is proportional to the torque is an operating parameter of the power take-off drivetrains.

9. The safety coupling of claim 1, wherein the disturbance detected is a disturbance in a vibration associated with at least one of a foundation of a machine to be driven and an immediate surrounding of the machine to be driven and wherein a vibration value associated with the detected vibration is assigned to the disturbance value.

10. The safety coupling of claim 1, wherein the disturbance detected is a presence of smoke and wherein the disturbance value is indicative of the detected presence of smoke.

11. A safety coupling configured for transferring torque between two coaxial machine components in a drivetrain, said safety coupling comprising:
    a coupling body configured for non-positively connecting the two machine components, said coupling body including:
        at least one thin-walled sleeve having a wall partially defining a pressurizable ring-shaped chamber; and
        at least one supply drilling extending through said coupling body and in fluid communication with said ring-shaped chamber;
    a plurality of sealing valves configured for fluid-tight sealing of said at least one supply drilling;
    a relief mechanism configured for acting directly on said sealing valves, said relief mechanism including at least one machine part containing an explosive substance configured for being activated upon appearance of a disturbance value, said at least one machine part being configured for acting directly on at least one said sealing valve at least one of during activation of said explosive substance and after activation of said explosive substance;
    a detecting device configured for detecting a disturbance and assigning the disturbance value to the detected disturbance, said detecting device being connected to said relief mechanism; and an activating device configured for activating said relief mechanism upon appearance of the disturbance value.

12. The safety coupling of claim 11, wherein said relief mechanism includes a shear device, said at least one machine part radially and axially holding said shear device substantially stationary relative to said at least one sealing valve, said shear device being movable a predetermined distance relative to said at least one sealing valve upon occurrence of a disturbance.

13. The safety coupling of claim 12, further comprising a power take-off shaft configured for being connected to said shear device at least directly in a torsionally rigid manner, said shear device being movably mounted substantially parallel to said power take-off shaft.

14. The safety coupling of claim 12, further comprising a power take-off shaft, said shear device being non-rotatably mounted relative to said power take-off shaft, said shear device being movably mounted substantially parallel to said power take-off shaft.

15. The safety coupling of claim 12, wherein said shear device comprises a shear disk.

16. The safety coupling of claim 12, further comprising a pre-loading device configured for pre-loading said shear device in a predetermined position during normal operation.

17. The safety coupling of claim 16, wherein said pre-loading device comprises a spring.

18. The safety coupling of claim 17, wherein at least one said sealing valve contains said explosive substance.

19. A safety coupling configured for transferring torque between two coaxial machine components in a drivetrain, said safety coupling comprising:

a coupling body configured for non-positively connecting the two machine components, said coupling body including:

at least one thin-walled sleeve having a wall partially defining a pressurizable ring-shaped chamber; and at least one supply drilling extending through said coupling body and in fluid communication with said ring-shaped chamber;

a plurality of sealing valves configured for fluid-tight sealing of said at least one supply drilling, at least one said sealing valve including:

a base body having:

a sealing unit blocking said at least one supply drilling; and a cap containing an explosive substance;

a retainer providing a radial limit-stop for said base body, said retainer including at least one bore extending radially through said retainer, said retainer being positively connectable to said coupling body;

at least one initiating electrode associated with said base body; and a distributor ring configured for generating a spark with said at least one initiating electrode;

a relief mechanism configured for acting directly on said sealing valves;

a detecting device configured for detecting a disturbance and assigning a disturbance value to the detected disturbance, said detecting device being connected to said relief mechanism; and an activating device configured for activating said relief mechanism upon appearance of the disturbance value.

20. The safety coupling of claim 19, wherein said at least one initiating electrode is coupled to said base body, said distributor ring being configured for being solidly mounted on a machine frame.

* * * * *